United States Patent [19]

Miller, Jr.

[11] 4,419,576
[45] Dec. 6, 1983

[54] FOCUS COMPENSATION LINKAGE

[75] Inventor: Warren H. Miller, Jr., Palm Bay, Fla.

[73] Assignee: Harris Corporation, Melbourne, Fla.

[21] Appl. No.: 303,136

[22] Filed: Sep. 17, 1981

[51] Int. Cl.³ .............................................. H04N 1/04
[52] U.S. Cl. .................................... 250/234; 350/6.6
[58] Field of Search ............... 250/216, 234, 235, 236, 250/560; 350/6.3, 6.6; 358/227, 293

[56] References Cited

U.S. PATENT DOCUMENTS 4,314,154 2/1982 Minoura et al. ...................... 350/6.6
4,327,959 5/1982 Minoura et al. ...................... 350/6.6

Primary Examiner—David C. Nelms
Assistant Examiner—Darwin R. Hostetter
Attorney, Agent, or Firm—Antonelli, Terry & Wands

[57] ABSTRACT

A defocus compensation linkage arrangement automatically corrects for the defocussing of the converging viewing lens onto a photodetector in a rotational optical scanning system wherein the distance between the photodetector and the source of the image varies during the rotational scan. This is achieved by a mechanical feed forward arrangement that effectively tracks the rotational movement of the scanner and continuously adjusts the distance between the lens system and the photodetector array as rotational movement proceeds. The defocus compensation linkage comprises a rotational-to-linear translator arrangement that responds to the rotation of the scanning optics about a fixed axis of rotation and moves the lens by an amount proportional to the changing distance between the image source and the photodetector array.

13 Claims, 5 Drawing Figures

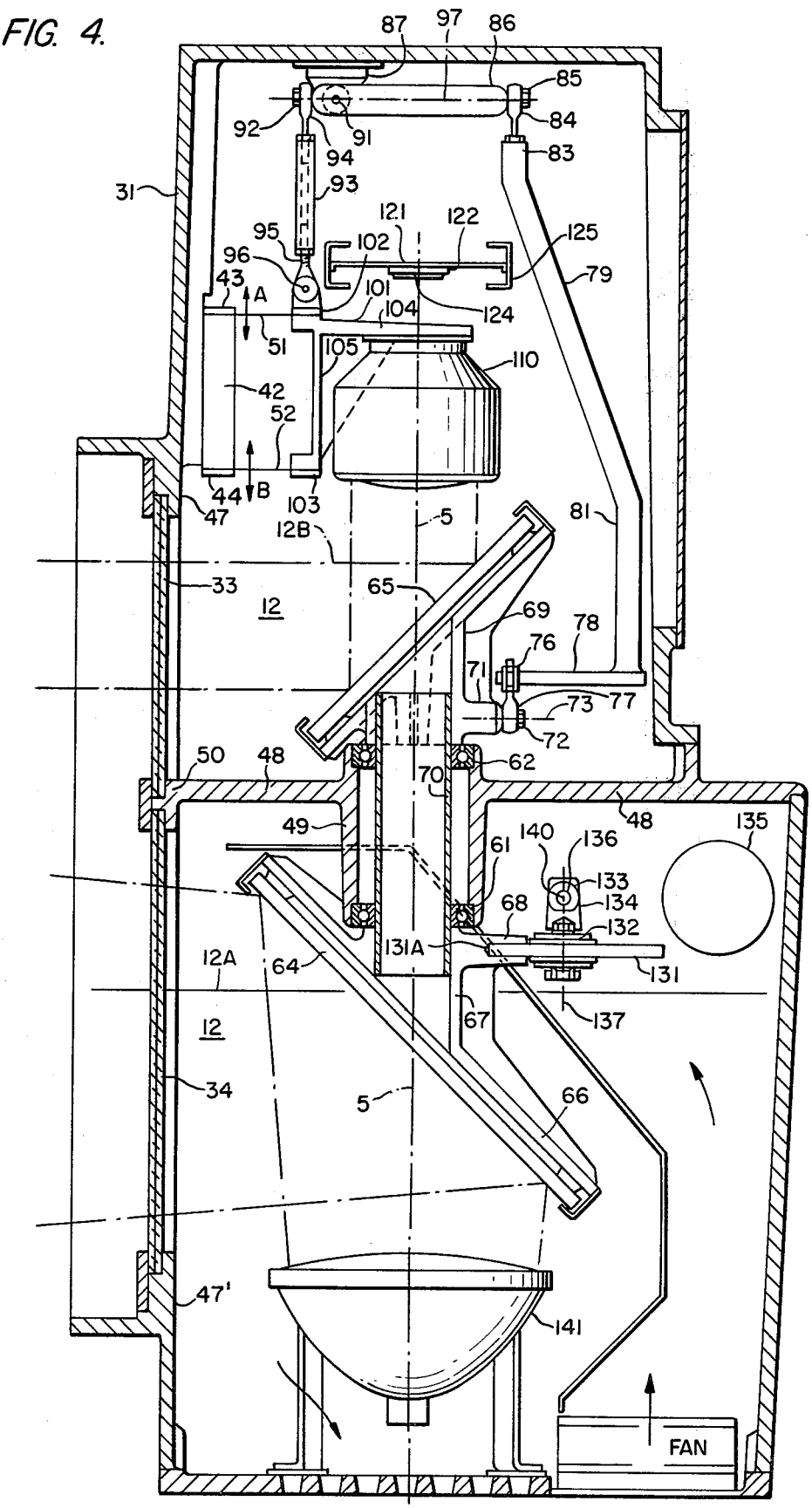

FOCUS COMPENSATION LINKAGE

FIELD OF THE INVENTION

The present invention relates to image scanning devices and is particularly directed to a scheme for maintaining the correct focus between a lens arrangement and an optical detector array during rotational movement of an image scanning system in which the distance between the image source and the scanning system varies during the rotational scanning.

BACKGROUND OF THE INVENTION

The development of optical scanning systems and associated electronic components has witnessed efforts towards miniaturization and better resolution through the aid of the improved products in the semiconductor industry, e.g. such as light sensitive photodiode arrays, injection laser diodes, etc. Because of their extremely small size these opto-electronic components may require one or more associated demagnifying lens systems to converge and focus an image beam into the extremely small area of the semiconductor photo responsive target. Where the photodetector-lens arrangement is employed in an optical scanning system, especially one involving rotational movement of the scanning optics, the distance between the image source and the photodetector target usually varies as the scan progresses, so that a continuous adjustment of the focussing of the image by the lens system on the photo responsive target is required. Often, this is achieved by an opto-electronic servo mechanism, which feeds back an error signal from the photodetector to a drive-focus controlling mechanism for the lens optics in an effort to maintain the image properly focussed on the target.

An exemplary environment where this need of continuous focus adjustment is necessary is in the lumber processing industry, e.g. a sawmill, where tree stems are examined for size and quality by an optical scanning system. The optical scanning system scans the stem from a distant viewing station and provides output signals representative of the characteristics of the stem, e.g. sweep, knots, etc. to electronic processing circuitry from which there is obtained, data representative of optimum partitioning of the log to maximize board feet yield and minimize waste. The optical scanning apparatus at the scanning station may be rotationally positioned above and to the side of the stem platform and may be arranged to sweep its imaging field of view along the length of the stem about a fixed axis of rotation. During the rotation of the viewing optics the distance between the portion of the stem being viewed and the photodetector changes, so that it is necessary to continuously compensate for the defocussing of the imaging lens that is positioned in front of the sensing opto-electronic module.

Previous proposals to deal with this problem have involved the use of a lens system having a large focal depth and an acceptance of the resultant defocussing as tolerable or the use of a servo arrangement for actively repositioning the lens system in response to an error feedback signal from the photodetector. Obviously the former approach creates a number of disadvantages, not the least of which is the less accurate data regarding stem partitioning and waste, while the use of an active servo mechanism adds components to the system that not only increase system complexity but add to its cost.

SUMMARY OF THE INVENTION

In accordance with the present invention, there is provided a defocus compensation linkage arrangement for automatically correcting for the defocussing of the converging viewing lens onto the photodetector in a rotational optical scanning system wherein the distance between the photodetector and the source of the image varies during the rotational scan. Pursuant to the inventive arrangement, rather than simply tolerate defocussing or employ a costly and complex servo-control mechanism, proper focussing of the lens on the photodetector is continuously achieved by a simple mechanical feed forward arrangement that effectively tracks the rotational movement of the scanner and continually adjusts the distance between the lens system and the photodetector array as rotational movement proceeds. To this end, the defocus compensation linkage comprises a rotational-to-linear translator arrangement that responds to the rotation of the scanning optics about a fixed axis of rotation and moves the lens by an amount proportional to the changing distance between the image source (e.g. some location on the stem) and the photodetector array. With the scanning optics rotating about an axis offset from and substantially perpendicular to a plane in which the axis of the stem being scanned lies, the distance between the photodetector and the lens for any point on the stem will be a function of $(K_1 - K_2 \cos \theta)$ where $K_1$ and $K_2$ are constants and $\theta$ is the angle of rotation of the scanning optics from a reference normal to the stem at its closest point to the scanning optics. The translator linkage includes an L-shaped link, one end of which contains a spherical rod end bearing attached to an arm that is coupled to the rotationally displaced scanning optics. The other end of the L-shaped link is coupled to one end of a bellcrank. The other end of the bellcrank is coupled to a linear translating link assembly that supports the lens system. As the scanning optics rotates, the bellcrank, in response to movement of the L-shaped link, is pivoted about its fulcrum to translate the lens system linearly toward or away from the photodetector array (depending on the direction of rotation of the scanning optics).

Typically, the scanning optics may be located on the order of 30 feet from a stem platform and, with ±45° of rotation, can scan stems up to on the order of 60 feet in length. Thus, the distance between the stem image source and the viewing optics may vary between 30–50 feet. On the other hand, with a miniaturized photodiode detector array and a focussing lens arrangement the actual displacement of the lens relative to the array may be on the order of only 0.5 mm. Yet, the mechanical linkage feed forward arrangement of the present invention accurately provides the required reduced translation, automatically converting the trigonometric change in scan position into a scaled down linear lens displacement and maintains the stem image accurately focussed on the photodetector array. The L-shaped link and bellcrank form a three-dimensional linkage from an arm on the rotating scanning optics through the bellcrank to the lens. The bellcrank serves to reverse the direction of motion between the linkage and the lens, supplies the required mechanical demagnification between the large movement of the linkage and the small movement of the lens, and provides an easily replaceable component, so as to allow convenient adaptation of the scanner to various angles of scan and to accommodate different types of lenses.

BRIEF DESCRIPTION OF THE DRAWINGS

FIG. 4 shows details of an optical scanning system including the defocus compensation linkage of the present invention.

DETAILED DESCRIPTION

Figure 1:
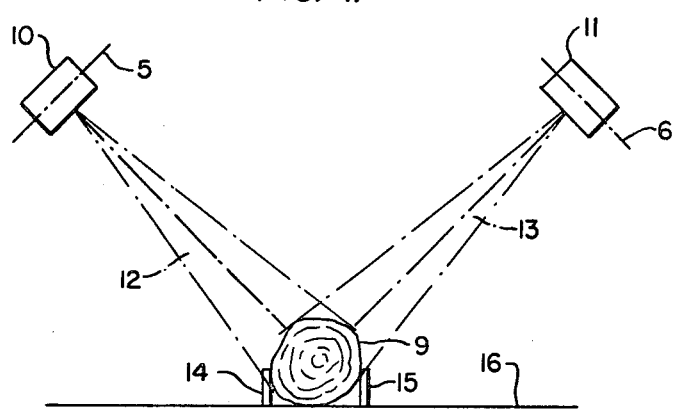
FIG. 1 is a diagrammatic view of a tree stem positioned relative to a pair of associated optical scanning systems.

FIG. 1 illustrates the manner in which a pair of scanners may be arranged in a sawmill environment for lengthwise optical scanning of a tree stem. Scanners 10 and 11 are shown generally in block diagram form as rotatable about a pair of respective axes 5 and 6. The details of a respective scanner will be presented below in conjunction with the description of FIGS. 4A and 4B. Each scanner has a field of view directed towards the stem 9 which is affixed between a pair of stops 14 and 15 on a log platform or deck 16. The respective fields of view 12 and 13 for each scanner provide an image of the stem 9 that is focussed upon a photodiode array contained within the scanning element.

Figure 2:
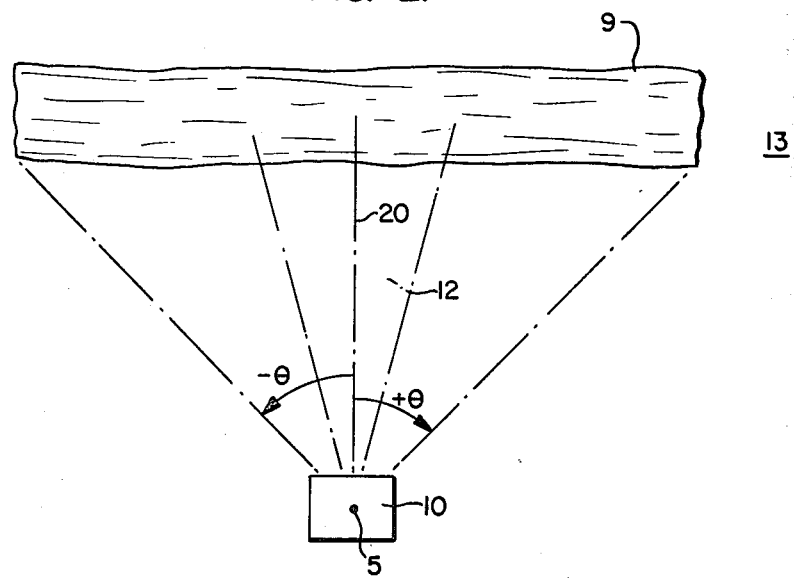
FIG. 2 is a side view of a tree stem and an associated optical scanning system.

A side view of the positioning an individual scanner, for example scanner 10, relative to the log or stem 9 is shown in FIG. 2. Typically, a tree stem may be on the order of 4 inches to 30 inches in diameter and up to approximately 60 feet in length as it rests upon the log platform or deck 16. The optical scanner 10, may be positioned on the order of 30 feet from the stem itself and is rotatable about axis 5 to sweep an arc $\theta = \pm 45°$, or approximately 90° total, namely 45° to one side of the normal to the stem and 45° to the other side of the normal to the stem, thereby scanning a distance that will accommodate up to the approximately 60 feet length of the stem. Within the optical scanning device the photodiode array, upon which an image of the stem is projected by a self-contained lens system, effectively sees a narrow section or vertical image slice through the stem and overlapping the edges of the stem, so that both the stem and background against which the stem rests is viewed by the photodiode array.

Figure 3:
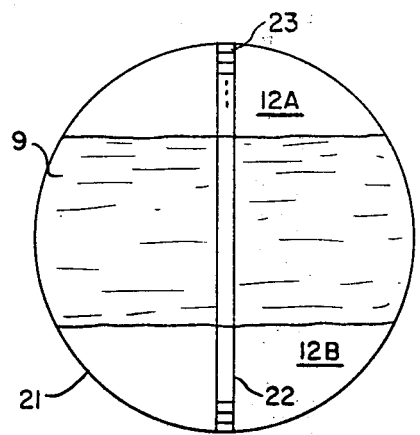
FIG. 3 illustrates the image of the scanning optics projected on a photodiode array.

FIG. 3 shows an exemplary image of the field of view of the scanner and a narrow strip or section associated with a stripe-shaped photodiode array which effectively views a vertical slice through the stem and adjacent background. Namely, the field of view of the lens system within the scanner, to be described below in conjunction with FIG. 4, is basically a circular field 21 as shown in FIG. 3. A portion of the stem 9 is seen within the field of view of the lens together with adjacent background areas 12a and 12b which occupy the remainder of the field of view adjacent the opposite edges of the stem. The lens focusses the image (stem and background) onto a narrow or stripe-shaped photodiode array so that the output of the photodiode array respresents the image of a narrow cross-sectional slice through the stem and adjacent background. Thus, some of the photodiodes will see background (adjacent the edges of the stem) while others will see the stem imaged thereon.

For a better understanding of this imaging and the novel focus compensation linkage of the present invention, attention is directed to FIG. 4 which show a partial sectional view, in detail, of the make-up of an individual scanner, which includes the photodiode array, focussing lens, imaging mirror arrangement and the focus compensation linkage to which the present invention is particularly directed.

The scanner itself includes a housing 31 having a pair of viewing windows 33 and 34 disposed in path of the field of view 12. Each of the windows 33 and 34 is held in place along the edges thereof by projections 47, 47' and 50 of the housing. To insure adequate illumination of the stem from the position of the scanner (which is typically located on the order of 30 feet from the stem), a light directing spotlight 141 may be contained within the housing 31. Spotlight 141 is positioned to have its beam coaxial with the main axis 5 of rotation of the scanner. The light beam emitted by spotlight 141 is directed towards a mirror 64 and reflected therefrom along a light projection axis 12A towards the stem 9 on the bed 13. The beam passing through projection window 34 illuminates a portion of the stem, while its reflected image passes along a reflected beam axis 12b through image receiving window 33 and reflects off a mirror 65 and once again along rotation axis 5 towards a focussing lens arrangement 110.

Support for scanning mirrors 64 and 65 is provided by boss 49 which extends from a central bulkhead 48 of the housing in which the mirror assembly, containing mirrors 64 and 65, is rotatably disposed. Mirror 64 is affixed to a mirror mount 66 having a substantially cylindrical base 67 that forms the cylindrical basemount of the mirror mount and contains a tubular projection 68. The cylindrical base 67 is also affixed to a cylindrical tube 70 which has mounted thereon an annular bearing race 61. In a similar fashion, mirror 65 is affixed to an upward cylindrical base 69 which has an arm 71 extending therefrom. Upper cylindrical base 69 is mounted on the upper portion of tube 70 around which is a second annular or ring-shaped bearing race 62. The bearing races themselves are affixed to a centrally disposed, and coaxial with axis 5, boss 49 of the housing. Since mirror 65, base 69, tube 70, base 66 and mirror 64 are integral with one another, and rotate freely by virtue of the pair of bearing races 61 and 62 within the cylindrical central boss portion 49 of the housing, a rotational force imparted to one of the mirror bases will necessarily create a corresponding rotational movement of the other base coaxial therewith.

This rotational movement is achieved by a rod 131 which is fixed to projection 68 of the base 67 of the mirror mount 66. Surrounding rod 131 is a slideable cylindrical sleeve 132, the top portion of which rotatably engages a carrier 134 and the axis of which is coaxial with the axis of rod 131. Carrier 134 is affixed to a cylindrical sleeve 133 the interior portion of which is threaded to engage a lead screw 136, the axis of which is normal to the plane of the drawing. A motor 135, through a gear or belt and pulley arrangement not shown, engages the lead screw 136 to cause rotation of the same when the motor 135 is energized. With rotation of the lead screw 136, the carrier 134 is caused to move normal to the plane of the drawing along the axis identified by point 140. During this motion, sleeve 132 which is rotatably held by carrier 134, rotates about axis 137 and thereby rotates rod 131 about axis 5 into or away from the plane of the drawing. Since sleeve 132 is slideable on the exterior surface of rod 131, rod 131 is free to rotate about axis 5 as it slides within the interior portion of sleeve 132. Since rod 131 is fixed to the tubular projecton 68 of the mirror mount 66, the mirrors 65 and 66 together with central cylindrical tube 70 are caused to rotate about axis 5. This causes the beam emitted by the spot light 141 to be scanned along the stem 9 (shown in FIG. 2) with the reflected stem image containing beam being directed along axis 12b and coincident with axis 5 of the rotation of the mirrors to a lens assembly 110.

The lens assembly 110 focusses the image within the field of view 12 onto a rectilinear photodiode array 124. For this purpose, lens 110 may comprise a conventional 135 mm. focal length converging lens arrangement. Photodiode array 124 may comprise a Reticon photodiode array containing 1024 individual photodiode elements, with the photodiode array being approximately 1 inch in length and 0.001 inch wide. The photodiode array 124 is affixed to a mounting board 121 within a receiver housing 125. The lead-outs for array and associated electronics are not shown in FIG. 4 as they are not necessary for an understanding of the invention and in order not to further complicate the drawing.

The lens assembly 110 is mounted on an L-shaped bracket 101 having a first leg 104 and a second leg 105 projecting 90° therefrom. An upper portion of the bracket 101 has affixed thereto one end of an adjustable link 93 which essentially comprises a turnbuckle having a threaded member 95 a circular end portion of which rotates about an axis 96 normal to the plane of the drawing. Clamped at opposite ends of the leg 105 of the L-shaped bracket 101 are a pair of thin flat flexible spring members or flexures, 51 and 52. For this purpose, a pair of plates 102 and 103 are mounted on opposite ends of leg 105 in order to firmly hold the ends of flexures 51 and 52 in place. The opposite ends of each of these flat spring members are mounted via a pair of similar plates 43 and 44 to the opposite edges of a substantially rectangular mounting member 42, which is affixed to the interior of the housing 31. With this arrangement, the opposite ends of each of flat springs 51 and 52 are effectively cantilever-mounted to the retainer 42 and the L-shaped bracket 101 for movement in direction of arrows A and B, respectively.

Figure 5:
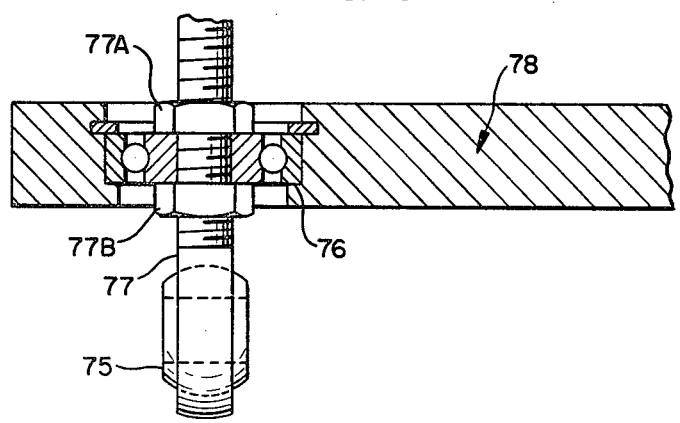
FIG. 5 is a detailed mechanical illustration of the rod end bearing portion of the focus compensation linkage as shown in FIG. 4.

The movement is controlled by the turnbuckle 93, the upper end of which contains threaded member 94 that is affixed to a bellcrank 66 by screw 92 passing through a hole in member 94 that is coincident with axis 97 of the bellcrank. The bellcrank rotates about an axis 91 of a fulcrum support base 87 that is affixed to the upper interior portion of the housing 31. The other end of the bellcrank 86 engages another screw 85 that passes through the spherical member of rod end bearing 84. The threaded portion of member 84 engages a threaded hole 83 at the upper portion of a compensation link member 79 having an upper leg 81 and a lower L-extension leg 78. The upper leg 81 of compensation link member 79 is slightly bent as shown to provide clearance for mirror 65. The extending portion of leg 78, which is adjacent to the upper cylindrical base 69 which holds mirror 65, contains a ball bearing 76 as shown in detail in FIG. 5.

More specifically, the shank of a rod end bearing 77 passes through the inner race of the ball bearing 76, and is clamped to the race with nuts 77A and 77B. This permits the rod end bearing to rotate freely about an axis parallel to axis 5. The spherical member 75 of the rod end bearing 77 is attached to the arm 71 by screw 72 that is threaded into arm 71 along axis 73. The combination of rod end bearings 77 and 84 and the ball bearing 76 permits arm 71 to rotate freely about axis 5, while the rigidity of link member 79 assures that the distance between the centers of the rod end bearings 77 and 84 remains constant.

In operation, when the mirror assembly is caused to rotate about axis 5 by the operation of motor 135, as explained previously, arm 71 of the upper cylindrical mirror mount 69 rotates about the axis 5 either out of the plane of the drawing or into the plane of the drawing along a plane normal to the drawing and containing axis 73. Assuming that the mirror is rotated in a direction so as to cause arm 71 to pivot about axis 5 out of the plane of the drawing, then rod end bearing 77 will also be carried out of the plane of the drawing. This means that the distance from the new position of rod end bearing 77 to the original position of rod end bearing 84 has increased. Since link 79 is rigid, rod end bearing 84 is pulled down slightly to maintain the constant distance between the rod end bearings 77 and 84. Since rod end bearing 84 is fixed to the end of bellcrank 86, the bellcrank rotates in a clockwise direction about axis 91 and thereby translates adjustable length turnbuckle 93 upwardly as viewed in the drawing. The vertical or upward movement of turnbuckle 93 creates a corresponding displacement in L-shaped bracket 101 and flexes spring members 51 and 52 slightly upwardly. As L-shaped bracket 101 moves in a vertical direction, the distance between the lens 110 and the photodiode array 124 decreases.

In other words, when the mirror assembly is rotated about axis 5 in either direction from the position in which it directly faces, or is orthogonal to, the log deck upon which the stem is mounted, there will be a corresponding rotation of rod end bearing 77 and thereby a movement of the linkage 79. The degree of movement is a maximum at the point of rotation of the mirror assembly which faces either extreme end of the stem. Thus the distance of the lens 110 from the photodiode array 124 is a minimum when the imaging beam is directed at the opposite ends of the stem and is at its maximum when the mirror assembly is aligned with a normal to the stem, (where the field of view is coaxial with perpendicular line 22 as viewed in FIG. 2).

As was pointed out previously, in a typical sawmill application, the distance from the scanner to the stem varies from about 30 feet at the center of the stem to about 50 feet at its opposite ends. To maintain the image of the log properly focused upon the array, the distance between the lens 110 and the photodiode array 124 must also change. This change amounts to a very small distance of about 0.5 mm. and varies as the angle of scan measured from the center of the stem varies. The displacement of the end of the bellcrank away from axis 97, which is created by movement of the linkage 79, displaces the L-shaped bracket 101 and moves the lens 110 towards and away from the photodiode array 124, so as to provide the necessary mechanical demagnification between a large movement of the linkage and a small movement of the lens. Moreover, because of the manner in which the leg extension 78 engages the rod end bearing 77 through the ball bearing 76, (rod end bearing being affixed to the rotatable mirror assembly through arm 71) the direction of motion between the linkage and the lens is properly reversed as the scanning mirror is scanned back and forth across the log.

It is also to be noted that by virtue of the use of simple threaded components, the focus compensation linkage of the present invention may be readily adapted for different scan angles and lens arrangements. In this regard, because the basic movement of the lens towards and away from the photodiode array is controlled by a bellcrank positioned above or behind the photodiode array, there is a very simple trigonometric relationship between the movement of the lens and the rotation of the mirror assembly, which is approximately proportional to a constant multiplied by $1-\cos\theta$ ($\theta$ = the angle of rotation). This means that once the position of the lens relative to the photodiode array has been established for proper focussing of the image of the stem on the photodiode array (a simple mathematical exercise) it is guaranteed that the image remains focused on the photodiode array regardless of the angle of rotation of the mirror, since the displacement of the lens photodiode array obeys the same trigonometric function which covers the distance between the stem and the axis of rotation of the mirror assembly.

Furthermore, through the simple mechanical arrangement of the present invention, complex servo mechanisms for establishing the proper positioning of the lens relative to the photodiode array are unnecessary, so that an especially simplified focus compensation arrangement is provided.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. An optical scanning arrangement comprising:
    first means for rotating an image scanning optical device about an axis of rotation, said image scanning optical device directing an image-containing beam toward a photodetector device;
    second means, disposed between said image scanning optical device and said photodetector device, for focussing said beam onto said photodetector device; and
    third means, responsive to the rotation of said image scanning optical device by said first means, for adjusting the distance between said second means and said photodetector device so as to maintain said image-containing beam focussed on said photodetector device irrespective of the rotational position of said image scanning optical device about said axis, said third means including
    means for controllably adjusting the distance between said second means and said photodetector device, and
    a rotational displacement-to-linear displacement translating link mechanism having a first arm portion pivotally coupled to said controllably adjusting means, a second arm portion extending from said first arm portion, and means for pivotally coupling said second arm portion to said first means so that rotation of said image scanning optical device by said first means about said axis causes pivotal movement of said second arm portion therewith and displacement of said first arm portion so as to cause said controllably adjusting means to change the distance between said second means and said photodetector device.

2. An optical scanning arrangement according to claim 1, wherein said axis of rotation intersects said second means and said photodetector device.

3. An optical scanning arrangement according to claim 2, wherein said controllably adjusting means includes:
    means for supporting said focussing lens so as to permit a prescribed amount of controlled linear displacement of said focussing lens relative to said photodetector device,
    a bellcrank, coupled to said support means, for controlling the degree of linear displacement thereof in response to a displacement force applied to an arm of said bellcrank, and wherein
    said first arm portion of said translating link mechanism is coupled to an arm of said bellcrank.

4. An optical scanning arrangement according to claim 3, wherein said axis of rotation is parallel to the direction along which the distance between said photodetector device and said focussing lens is adjusted by said third means.

5. An arrangement according to claim 1, wherein said means for pivotally coupling said second arm portion to said first means includes means for effecting a spherical-to-rotational coupling between said second arm portion and said first means.

6. An optical scanning arrangement according to claim 3, wherein said supporting means comprises a cantilevered flat spring arrangement by way of which said focussing lens is supported relative to said photodetector device.

7. An optical scanning arrangement according to claim 6, wherein said photodetector device comprises a linear array of photodetector elements.

8. An optical scanning arrangement according to claim 3, wherein said optical scanning device comprises a first rotatable mirror supported for rotation about said axis of rotation and reflecting an incident image-containing beam to said focussing lens.

9. An optical scanning arrangement according to claim 8, wherein said optical scanning device further comprises a light source and a second rotatable mirror supported for rotation about said axis of rotation and reflecting light emitted by said light source towards an object the image of which is contained in the image-containing beam reflected by said first rotatable mirror to said focussing lens.

10. An optical scanning arrangement according to claim 5, wherein said link mechanism includes means for effecting a spherical-to-rotational coupling between said first arm portion and said controllably adjusting means.

11. An apparatus comprising:
    first, second and third elements disposed in a direction parallel to a prescribed axis;
    first means for rotating said first element about said axis; and
    second means, responsive to the rotation of said first element by said first means, for adjusting the distance between said second and third elements along said direction and including
    means for effecting controlled displacement of said second element relative to said third element along said direction, and
    a rotational displacement-to-linear displacement translating link mechanism having a first arm portion pivotally coupled to said controlled displacement effecting means, a second arm portion extending from said first arm portion, and means for pivotally coupling said second arm portion to said first means so that rotation of said first element by said first means about said axis causes pivotal movement of said second arm portion therewith and displacement of said first arm portion so as to cause said controlled displacement effecting means to change the distance between said second and third elements along said direction.

12. An apparatus according to claim 11, wherein said means for pivotally coupling said second arm portion to said first means includes means for effecting a spherical-to-rotational coupling between said second arm portion and said first means.

13. An apparatus according to claim 12, wherein said link mechanism includes means for effecting a spherical-to-rotational coupling between said first arm portion and said controlled displacement effecting means.

* * * * *